Aug. 21, 1962 — K. B. BREDTSCHNEIDER — 3,049,794
METHOD OF TESTING AND APPLYING VALVE SEAT RINGS
Filed Sept. 30, 1957 — 2 Sheets-Sheet 1
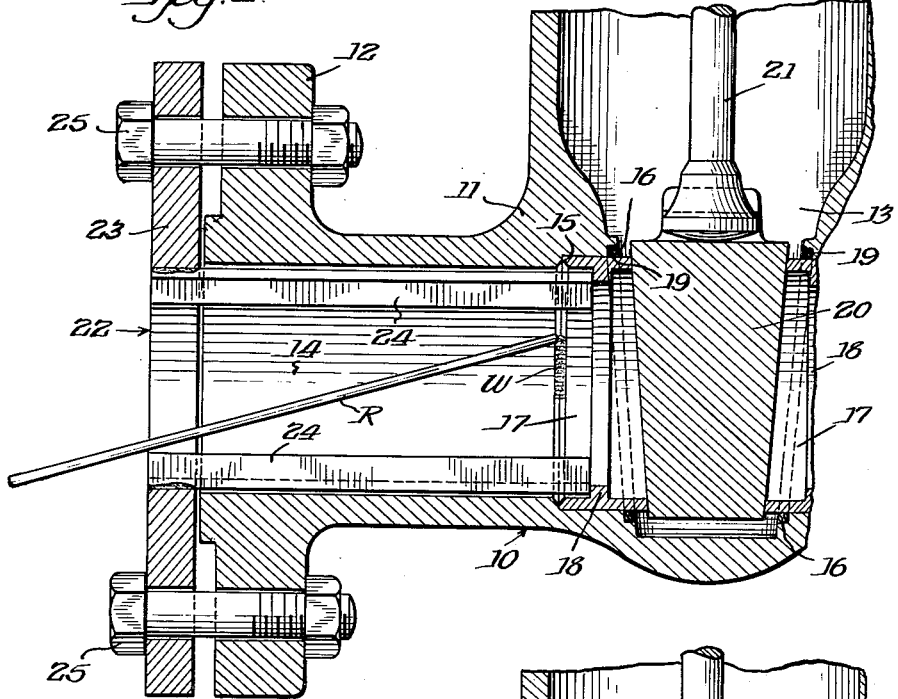
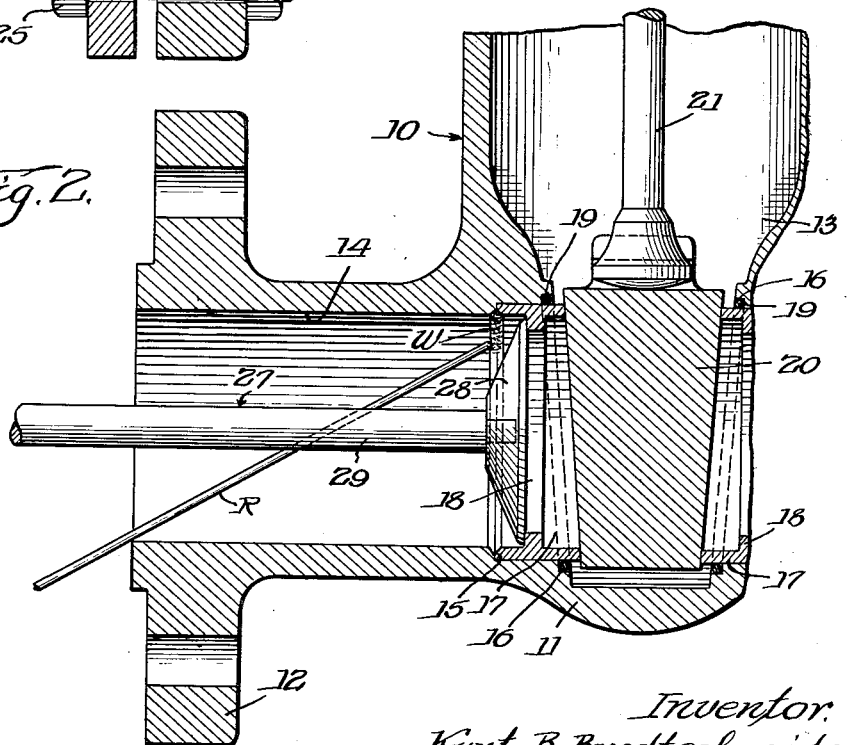
Inventor:
Kurt B. Bredtschneider
By Joseph O. Lange
Atty.

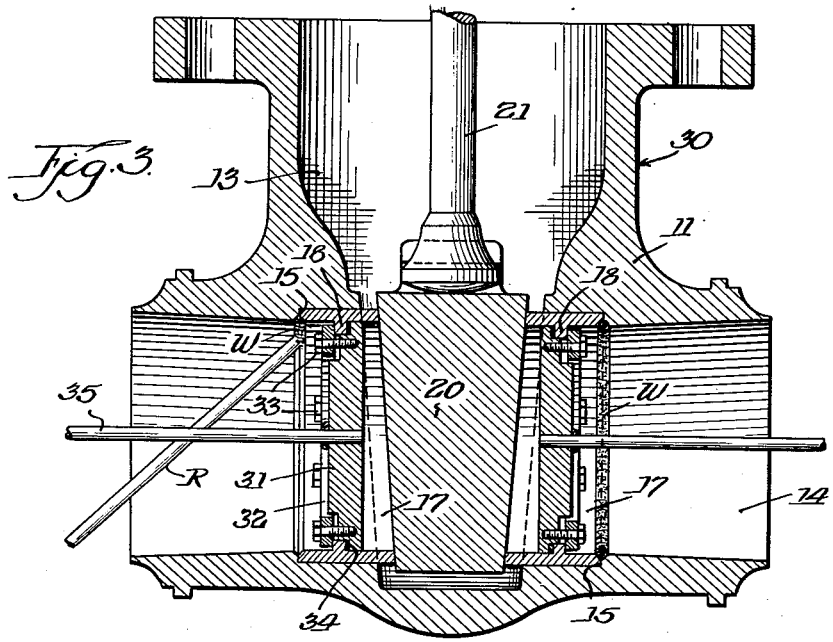
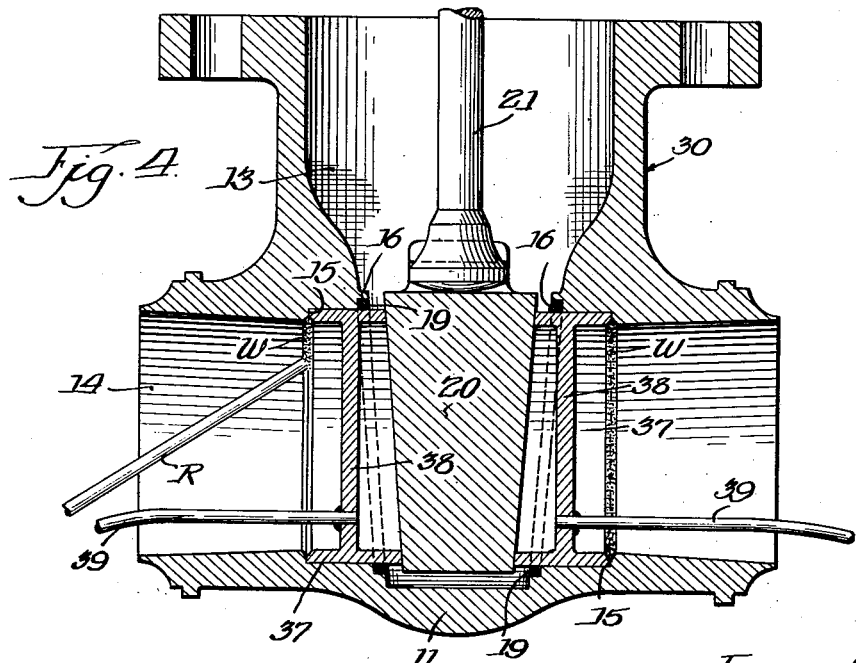

United States Patent Office 3,049,794
Patented Aug. 21, 1962

3,049,794
METHOD OF TESTING AND APPLYING VALVE SEAT RINGS
Kurt B. Bredtschneider, Chicago, Ill., assignor to Crane Co., Chicago, Ill., a corporation of Illinois
Filed Sept. 30, 1957, Ser. No. 687,131
11 Claims. (Cl. 29—157.1)

The present invention relates generally to a method for testing of wedge gate valves for leakage, and more particularly to the leak testing of welded-in seat rings of wedge gate valves prior to the welding thereof in the valve body.

In testing the tightness of the closure in wedge gate valves, additional machining of the seating surfaces of the disk closure member or seat rings, or of both disk closure member and rings, is often necessary when excessive leakage is discovered. The disk may readily be removed when its surfaces are to be further finished, and screwed-in seat rings likewise may be removed from the valve body during the testing stage for additional lapping or other machining to give a full, tight contact with the disc. In wedge gate valves employing seat rings which are welded in place in the valve body, however, the present practice is to weld the rings in place in the valve body, while positioned by a dummy wedge disk disposed therebetween, then to lap or otherwise machine the seating surfaces of the rings if necessary to make them truly planar, machine a valve disk to fit the seat rings, and test the seats for tightness in the assembled valve with the disk in closed position. In the event of leakage, or more than allowable test leakage, as the case may be, the seating surfaces of the rings or disk, or of both, are again lapped, ground, or otherwise machined to obtain a tight fit. This generally outlined procedure is time-consuming and costly, especially with larger valves which do not allow of lapping of the seating surfaces but which require a grinding or like operation with the valve body mounted in the appropriate machine.

The present invention is directed to simplifying, shortening, and reducing the cost of, the assembling and testing procedure. In brief, it provides a method by which seat leakage testing of a wedge gate valve with welded-in seat rings is accomplished while the seat rings are unsecured in the body but held in close contact with the disk, in which position they are welded in the body if the test indicates satisfactory leakage characteristics. In the event leakage exceeds the maximum allowable on test, the seat rings as well as the disk may readily be removed for machining, so that the complications arising from precise mounting of the valve body in a machine to perform an operation only on the rings already secured therein are avoided.

The method of this invention has the further advantage that the disk to be assembled in the valve is preferably employed both in positioning the seat rings and in testing for leakage, so as to eliminate possible leakage due to variations of the valve disk from a dummy disk used for positioning the rings in securement thereof. In addition, the invention contemplates the welding of the rings in place while a test pressure at least equal to the expected service pressure is maintained, so that no greater deflection of the parts will occur in service to cause possible leakage than that which occurs while the rings are being secured in place under acceptable leakage conditions.

It is accordingly an object of the present invention to provide a novel and improved method of testing wedge gate valves for seat leakage.

Another object is the provision of a method of combinedly testing and applying seat rings of the welded-in type in wedge gate valves.

Another object is the provision of a method of testing wedge gate valves with welded-in type seat rings for seat leakage before permanent securement of the rings.

A further object is the provision of a method of permanently securing welded-in type seat rings in wedge gate valves while subjecting the valves to seat leakage testing at a pressure at least equal to the intended service pressure.

Other and further objects, advantages, and features of the invention will be apparent to those skilled in the art from the following detailed description and the accompanying drawings, in which—

FIG. 1 is a fragmentary longitudinal sectional view through a gate valve, illustrating one manner of testing and applying seat rings according to this invention;

FIG. 2 is a view similar to FIG. 1, but illustrating another manner of applying seat rings according to the invention;

FIG. 3 is a longitudinal sectional view through a gate valve, showing another modification of the inventive method; and FIG. 4 is a view similar to FIG. 3, illustrating a further modification of the method.

Referring first to FIG. 1 of the drawings, there is shown a portion of a flanged wedge gate valve 10 having a casing or body 11 with a bolting flange 12 at each end, only one being shown. On each side of its intersection with the central cavity or body chamber 13, the flow passage 14 through the valve is enlarged to define a shoulder 15, and about the apertures defined by the intersection of the flow passage with the body chamber are formed shoulders 16. A pair of seat rings 17 to be welded in the body 11 are disposed in the flow passage, each with its outer edge substantially engaging the adjacent shoulder 15 and its inner end projecting into the body chamber 13. Each seat ring has an integral inner rib 18, and its inner end edge is formed as a seat for a valve disk. The inner portion of each seat ring 17 defines with one of the shoulders 16 a groove in which an O-ring 19 or similar gasketing means is inserted to seal against leakage out of the body chamber about the ring. Of course, other sealing arrangements may be used. Between the rings 17 is disposed a wedge-type valve gate disk 20 of any suitable construction with opposed surfaces adapted to seat on the seating faces of the rings. A valve stem 21 may be employed for positioning the disk, or other means may be provided, as will appear hereinafter. The disk 20 preferably is the disk to be assembled in the valve for cooperation with the seat rings 17, but may be a dummy disk if desired.

With the parts positioned as shown and described, the seat rings are pressed tightly against the disk, after making certain the planes of the seat ring seating faces parallel the planes of the disk seating surfaces so as to make full annular contact therewith, and a suitable fluid under the desired testing pressure is introduced into the body chamber 13. By reason of the seals provided by the O-rings 19, leakage past the seats can occur only between the seat rings 17 and disk 20. Any such leakage, or in some instances leakage exceeding an allowable maximum, is of course an indication that the seating surfaces of the disk and seat rings do not engage closely enough, or in other words do not provide tight joints. Since the rings 17 are not secured, both the rings and the disk 20 may readily be removed from the valve body 11 and the surfaces operated upon as may be appropriate to obtain a fluid-tight fit.

In FIG. 1, the means for pressing the seat rings against the disk are shown as a pair of pressing members, one for each seat ring, generally designated 22. Each member 22 comprises a flange ring 23 to the radially inner surface of which are welded the ends of a plurality of fingers 24, shown as angle members, projecting outwardly of one face of the ring 23 a distance somewhat greater than the distance from the end of the valve 10 to the rib 18 of the seat ring 17. The flange rings 23 have the inner diameter thereof slightly less than that of the flow passage 14, and the outer diameter substantially corresponding to that of the valve bolting flanges 12. Each ring is provided with bolt holes corresponding to bolt holes of the flanges. To apply the desired pressure to the seat rings 17, each of the pressure members 22 is disposed with its fingers 24 extending into the valve passage 14 and then moved inwardly to engage the fingers with the rib 18 of the adjacent seat ring. By means of bolts 25 passed through the corresponding holes in the flange rings 23 and the valve bolting flanges 12, the pressure members are drawn up to press the seat rings 17 tightly against the disk 20.

To prevent the disk 20, due to its wedge shape, from being forced out from between the seat rings by the pressure applied thereto, a conventional bonnet and yoke structure, not shown, may be secured on the valve with suitable operating means for actuating the stem 21 to move the disk between, and hold the same in, open and closed positions, as well known in the art. By operation of the stem, the disk may be moved to position between the seat rings, corresponding to the closed position, and held in that position. The fluid under pressure by which the seats are tested may be supplied through a suitable opening in the bonnet or in the valve body 11. Instead of employing the stem 21 and the usual bonnet and yoke arrangement, a suitable cover plate may be bolted or otherwise secured over the opening of the body chamber 13, means being provided to engage between the cover plate and the valve disk after the latter has been manually positioned between the seat rings. For example, a spud may be formed integrally with the cover plate or be secured to the inner face thereof so as to abut against the disk 20 when the cover plate is secured in position and thus hold the disk in place. In such case, the test fluid may be admitted to the body chamber through the cap or through the wall of the valve body. Of course, other means might be employed to accomplish the same purpose.

When the test indicates satisfactory tightness of the seats, either initially or after further finishing of the seating surfaces, the seat rings are secured in place in the valve body while held in the position determined by the test to provide the satisfactory seat tightness. A welding rod R is inserted through the opening of the flange ring 23 and the flow passage 14 of the valve, and the outer end edge of the valve seat is welded to the shoulder 15, as indicated at W. The rod is moved along the edge of the seat ring for the distance allowed by the spacing of two adjacent fingers 24, and then similarly between another two of the fingers, and so on until a weld has been formed about the entire edge of the seat ring except for the gaps caused by interference of the fingers with the rod. The pressure member 22 is then released and reapplied, if desired, after rotation thereof to position the fingers out of the interfering relation with the unwelded portions of the seat ring edge, so that the weld along the edge of the seat ring may be completed. Ordinarily, it will be found entirely satisfactory after a weld has been formed partially about the seat ring to remove the pressure member completely and then finish the welding operation. It is preferable to perform the welding operation while the seats are subjected to the test pressure, so as to assure that the seat rings will be secured in the body in the test position which has been proved to give satisfactory tightness. It is entirely possible, however, to obtain satisfactory results with the test pressure removed. After the seat rings have been welded in place, the ribs 18 thereof are cut away, as by grinding or other appropriate operation, and the O-rings 19 are removed. It will, of course, be obvious that the ribs 18 are employed to provide a bearing for the fingers 24, so that the desired pressure can be applied to the seat rings. Instead of the ribs, a plurality of spaced lugs or other suitable projections might be employed against which the fingers 24 of the pressure members could engage, and at least in certain cases removal of such projections would not be necessary.

In FIG. 2, the valve 10 is shown with the seat rings 17 and disk 20 in position as described in connection with FIG. 1, but instead of the pressure members 22, pressure members generally designated 27 are employed to force the seat rings tightly against the disk. Only the pressure member acting on one of the seat rings is shown, it being understood that a similar member is provided for operation on the other seat ring. Each member 27 comprises a pressure disk 28 secured on the inner end of a rod 29 projectable through the open end of the valve to engage the rib 18 of the seat ring. The rod 29 is longitudinally reciprocable, as by being secured to or forming part of a ram of a hydraulic press or the like. Testing of the valve seats is carried out in the manner described in connection with FIG. 1, but welding of the seat rings in place in the body is somewhat different in that the weld may be made continuously along the outer edge of the seat ring instead of interruptedly as necessitated by the fingers 24 of the pressure members 22. The provision of pressure members 27, without any elements extending adjacent the edge of the seat ring, and with pressure applied through the centrally disposed rod 29, permits the weld rod R to be employed in such a manner as to avoid the necessity for making disconnected portions of the weld W before releasing the pressure on the seat rings.

It may be pointed out that instead of pressing the seat rings against the disk as described in connection with FIGS. 1 and 2, the disk may be pressed wedgingly against the seat rings, so as to force the latter into engagement with the respective shoulders 15. The test fluid may then be introduced into the body chamber to test the tightness of the seats, and upon indication of satisfactory tightness being achieved the seat rings may be welded to the body substantially as described. In this case, no pressure members are required, and the welds may of course be made without any possibility of interference by such members. The ribs 18 of the seat rings of course also are unnecessary.

FIG. 3 shows a valve generally designated 30 which is generally similar to the valve 10, but has butt welding ends instead of the flange ends of the valve 10. The valve 30 has the seat rings 17 with ribs 18 thereon, disposed with their outer end edges engaging the shoulders 15 of the flow passage 14, and the disk 20 is disposed between the seat rings as in the arrangement of FIGS. 1 and 2. The stem 21 is provided for operation of the disk, although other means may be employed for this purpose if desired. O-rings 19 are not employed with the arrangement of FIG. 3, and accordingly the shoulders 16 of the valve 10 are not provided. The openings through the seat rings 17 are closed each by a cover plate 31 which is formed with a step formation along its edge to allow the plate to engage the inner face of the rib and project at least partially through the aperture defined by the rib. A shoulder ring 32 is provided engaging the outer face of the rib 18, and bolts 33 extend through the shoulder ring and cover plate to clamp the plate against the rib. A suitable gasket 34 is disposed between the cover plate and rib to seal against leakage therebetween. Each cover plate 31 is apertured to receive one end of a tube, pipe or other conduit 35 through which pressure fluid may be introduced into the space between the disk 20 and cover plate 31 within the ring 17.

In testing and applying the seat rings by means of the arrangement of FIG. 3, the disk 20 is wedged tightly against the seat rings 17 so as to force them against the shoulders 15 while providing tight contact between the seating surfaces of the disk and ring, as already explained. Fluid under the desired pressure is then introduced from a suitable source (not sohwn) through the conduits 35 into the closed spaces within the seat rings. Since the spaces are sealed against leakage between the rings and the plates 31, any leakage of fluid must occur between the seating surfaces of the disk and seat rings. If such leakage occurs, the arrangement may readily be disassembled and the sealing surfaces operated upon to provide tight seating upon being again disposed within the valve 30. When an indication of satisfactory tightness of the seats is given by the test fluid, the seat rings are welded in place by welds W along the abutting surfaces of the shoulders 15 and outer ends of the rings, by means of a weld rod R or other appropriate means. It will be clear that the welds may be continuously formed, since there are no obstacles to interfere with the engagement of the rod R along the joints between the seat rings and body. As pointed out in connection with FIGS. 1 and 2, it is preferable that the welding of the seat rings be carried out while the parts are subjected to the test pressure, although if desired, the test fluid pressure may be relieved, and only the pressure of the disk 20 against the seat rings maintained. After the welds have been completed, the bolts 33 are removed to separate the shoulder rings 32 and cover plates 31, and the disk is moved to open position to allow removal of the cover plates from within the seat rings. The ribs 18 are thereupon cut out as already described.

In FIG. 4, the valve 30 is shown substantially as in FIG. 3, with seat rings 37 similar to the rings 17 previously described disposed within the body in engagement with the shoulders 15. The seat rings 37 are formed with integral webs 38 closing the apertures therethrough. The valve in this instance is formed with the shoulders 16 which define with the seat rings 37 a pair of grooves for O-rings 19 which seal against leakage between each of the seat rings and the body 11. Extending through each of the webs 38 is a tube, pipe, or other suitable conduit 39 through which fluid leaking between the sealing surfaces may escape.

In testing with this arrangement, the seat rings 37 are forced against the shoulders 15 by the wedging action of the disk 20 already described, the sealing surfaces being tightly engaged at the same time. Pressure fluid is supplied to the body chamber 13 as in the case of the arrangements of FIGS. 1 and 2, and can leak only into the space within the seat rings defined between the webs 38 and the disk 20. If such leakage occurs, fluid escaping through the conduits 39 will give an indication thereof. When satisfactory tightness of the seats is indicated by the test fluid, the seat rings are secured in place by welds W formed by means of the rod R, preferably while the test pressure is maintained, as already described. The webs 38 may then be cut out of the seat rings in any suitable manner, and the O-rings 19 removed.

The arrangement of FIG. 4 is particularly adapted for use with a gaseous test fluid, but is also employable with a liquid. In the latter case, the conduits 39 may communicate with the spaces within the seat rings defined between the webs 38 and disk 20 at a point slightly above the low point of such space in the particular position of the valve during the test. In the illustration of FIG. 4, the valve is shown as positioned with the opening of the body chamber uppermost, and the conduits 39 are therefore shown as communicating with the spaces within the seat rings at points close to the plane in which the seat rings approach most closely to each other. If a certain rate of leakage is permissible in the valve under test, the location of the point of communication between the conduit 39 and the interior space provides a simple and eminently satisfactory way to determine whether such rate has been exceeded or not. By locating the opening of the conduit at a level such that a given volume of liquid must accumulate in the space before it will escape through the conduit 39, and determining such volume in accordance with the maximum leakage rate and the desired period of the test, a clear indication of satisfactory or unsatisfactory leakage rate is given. If during the period of the test no liquid escapes through the conduit 39, it is obvious that the leakage is below the maximum allowable, while if by the end of the test period liquid flows through the conduit 39, excessive leakage is clearly indicated. The spacing of the openings of the conduits 39 to the spaces within the seat rings is exaggerated in FIG. 4 for clearness in illustrating the principle.

It is to be pointed out that in the arrangements of FIGS. 3 and 4, the pressure members 22 or 27 or other means for the same purpose might be employed if desired to press the seat rings 17 or 37 against the disk, instead of having the disk press the seat rings against the shoulders 15. It should also be apparent that in the arrangement of of FIG. 3, instead of introducing pressure fluid through the conduits 35, it might be introduced through the body cavity 13 as described in connection with FIGS. 1, 2, and 4, simply by employing the O-rings 19, as already described. Similarly, the arrangement of FIG. 4 may be employed in the manner described in connection with the FIG. 3 arrangement, pressure fluid being introduced through the conduits 39. In such case, the O-rings 19 are not necessary and may be omitted. It is also pointed out that the arrangement of FIG. 2 may be employed in the manner of either the FIG. 3 or FIG. 4 arrangement merely by forming the rods 29 of the pressing members 27 hollow and employing them as conduits for introducing the test fluid or discharging leakage. Suitable gaskets may be provided between the pressure disks 28 and ribs 18 when fluid under pressure is so introduced.

While the seat rings have been disclosed herein as being secured in the valve body by welding, it will be evident that the method of this invention does not require and is not limited to the welding of the seat rings in place, the welded-in seat rings representing the type of rings which are not threadedly secured in place. Thus, the welded-in type of seat ring might be secured in the valve body by other means than welding, as by brazing, a rolling-in operation, cementing, or any other appropriate manner, without departing from the present invention.

Although several modifications of the invention have been disclosed herein, it will be obvious that other modifications and variations may be made without departing from the basic inventive concept, and accordingly it is not intended that the invention be limited otherwise than as required by the spirit and scope of the appended claims.

I claim:

1. A method of pretesting the seat rings and disk of a wedge gate valve, comprising positioning a pair of opposed seat rings in a valve body with a wedge disk therebetween, adjusting said rings into full surface contact with the disk seating surfaces, pressing the disk between the rings to obtain tight joints between the contacting surfaces, subjecting said joints to fluid under pressure to test for leakage therethrough while preventing leakage past the rings otherwise, and upon indication of satisfactory leakage characteristics of the joints securing the rings in the body in the test position.

2. A method of combinedly testing and applying the seat rings of a wedge gate valve, comprising positioning a pair of seat rings in a valve body with a wedge disk therebetween, adjusting said rings into surface contact with the disk seating surfaces, applying pressure to the disk and rings to hold the contacting surfaces thereof closely together, subjecting the joints between the contacting surfaces to fluid under pressure to test for leakage therethrough while preventing leakage about the rings otherwise, and upon indication by said fluid of satisfactory tightness of said joints securing the rings in the body in the test position.

3. A method of pretesting the seat rings and disk of a wedge gate valve which comprises positioning a pair of seat rings in a valve body with a wedge disk therebetween, applying pressure to the disk and rings to bring the seating surfaces thereof into close contact, subjecting the joints between the contacting surfaces to fluid under pressure to test for leakage therethrough, and during said subjection to pressure fluid securing the rings in the body in the test position upon indication by said fluid of satisfactory tightness of said joints.

4. A method of combinedly testing and applying the seat rings of a wedge gate valve which comprises positioning a pair of opposed seat rings in a valve body with a wedge disk therebetween, temporarily sealing against leakage between each ring and the body, adjusting the rings into annular surface contact with the disk seating surfaces, pressing the rings against the disk to urge the contacting surfaces thereof into close engagement, applying fluid under pressure through the body chamber to the joints between the disk and rings while so pressed to test for leakage therethrough, permanently securing the rings in the body in the adjusted position upon indication by the fluid of satisfactory leakage characteristics of said joints, and terminating said temporary sealing.

5. A method combinedly testing and applying the seat rings for a wedge gate valve which comprises positioning a pair of opposed seat rings in a valve body with a wedge disk therebetween, sealing against leakage between each ring and the body, adjusting the rings into full annular contact with the disk seating surfaces, urging the rings into close contact with the disk seating surfaces upon said adjusting, during said urging applying fluid under pressure through the body chamber to the joints between the disk and rings to test the tightness thereof, and upon indication by the fluid of satisfactory leakage characteristics of said joints permanently securing the rings in the body in the test position.

6. A method of combinedly testing and applying the seat rings of a wedge gate valve which comprising positioning a pair of opposed seat rings in a valve body with a wedge disk therebetween, wedging the disk against the rings to effect close contact of its seating surfaces with the rings, adjusting the rings into unbroken annular contact with the disk seating surfaces, applying fluid under pressure through the body chamber to the joints between the contacting surfaces of the disc and ring while so wedged to test for leakage therethrough and simultaneously preventing leakage past the rings otherwise, and upon indication by the fluid of satisfactory leakage characteristics of said joints securing the rings in the body in the test position.

7. A method of combinedly testing and applying the seat rings of wedge gate valves which comprises positioning a pair of opposed seat rings in a valve body with a wedge disk therebetween, adjusting the rings into position for full annular contact with the seating surfaces of the disk, wedging the disk against the rings upon said adjustment to effect close contact of the seating surfaces of the disk and rings, applying fluid under pressure through the body chamber to the joints between the disk and rings during said wedging to test the tightness thereof while preventing leakage past the rings otherwise, and upon indication by the fluid of satisfactory tightness of said points securing the rings in the body in the test position thereof.

8. A method of combinedly testing and applying the seat rings of a wedge gate valve which comprises positioning a pair of opposed seat rings in a valve body with the wedge disk of the valve therebetween, wedging the disk against the rings to effect close contact of its seating surfaces with the rings, effecting full annular contact of the rings with said disk surfaces, closing the openings of the rings except for fluid apertures each communicating with the space between the disk and of the rings, applying fluid under pressure through said apertures to the joints between the contacting surfaces of the disk and rings while so wedged to test for leakage therethrough, and securing the rings in the body in the test position upon indication by said fluid of satisfactory leakage characteristics of said joints.

9. A method of combinedly testing and applying the seat rings of a wedge gate valve which comprises positioning a pair of opposed seat rings in a valve body with a wedge disk therebetween, adjusting the rings for full annular contact with the seating surfaces of the disk, wedging the disk against the rings upon said adjustment to effect close contact of the seating surfaces of the disk and rings, applying fluid under pressure to the spaces between the rings and disk during said wedging to test the joints between the disk and rings for leakage therethrough while preventing leakage through the ring openings, and upon indication by said fluid of satisfactory leakage characteristics of the joints securing the rings within the body in the test positions thereof.

10. A method of combinedly testing and applying the seat rings of a wedge gate valve which comprises loosely positioning a pair of opposed seat rings in a valve body with a wedge disk therebetween, wedging the disk against the rings to effect close contact of its seating surfaces with the rings, closing the openings of the rings except for fluid outlet apertures each communicating with the space between the disk and one of the rings, applying fluid under pressure through the body chamber to the joints between the disk and rings during said wedging to test for leakage therethrough while preventing leakage past the rings otherwise, securing the rings in the body in the test position upon indication by the fluid of satisfactory leakage characteristics of said joints, and opening said rings.

11. A method of combinedly testing and applying the seat rings of a wedge gate valve which comprises loosely positioning a pair of opposed seat rings in a valve body with a wedge disk therebetween, wedging the disk against the rings to effect close contact of its seating surfaces with the rings, closing the openings of the rings except for fluid outlet apertures communicating each with the space between the disk and one of the rings at a location to limit accumulation of liquid in said space to a predetermined level, applying liquid under pressure through the body bonnet recess to the joints between the disk and rings during said wedging to test for leakage therethrough while preventing leakage past the rings otherwise, upon indication of satisfactory leakage characteristics of said joints by absence of liquid accumulation in said spaces to said level securing the rings in the body in the test position, and opening said closed ring openings after said indication.

References Cited in the file of this patent

UNITED STATES PATENTS

| Re. 9,142 | Strehli | Apr. 6, 1880 |
| 197,994 | Burnett | Dec. 11, 1877 |
| 2,426,406 | Meyers | Aug. 26, 1947 |
| 2,627,651 | MacGregor | Feb. 10, 1953 |
| 2,752,669 | Carr | July 13, 1956 |
| 2,868,495 | Lucas | Jan. 13, 1959 |
| 2,950,897 | Bryant | Aug. 30, 1960 |

OTHER REFERENCES

Steel Iron and Non-Ferrous Valves, Report of a Visit to the U.S.A. in 1950 of a Productivity Team representing the Valve Industry, published for the Valve Productivity Team by the Anglo-American Council on Productivity. U.S. Section: 2 Park Ave., New York city 16, N.J., June 1951, page 41.